United States Patent [19]

Van Mol

[11] 4,340,470
[45] Jul. 20, 1982

[54] LIQUID FILTER

[76] Inventor: John D. Van Mol, Box 13, Group 20, R.R. #1, Winnipeg, Manitoba, Canada, R3C 2E4

[21] Appl. No.: 222,360

[22] Filed: Jan. 5, 1981

[30] Foreign Application Priority Data

May 2, 1980 [CA] Canada ................................. 351191

[51] Int. Cl.³ ............................................. B01D 35/28
[52] U.S. Cl. ...................................... 210/94; 210/447
[58] Field of Search ................ 210/94, 447, 446, 310, 210/435

[56] References Cited

U.S. PATENT DOCUMENTS

| 738,088 | 9/1903 | Vauclain et al. | 210/447 |
| 2,552,744 | 5/1951 | Smith | 210/447 |
| 2,661,096 | 12/1953 | Tinker | 210/310 |
| 2,971,650 | 2/1961 | Miranda | 210/447 |
| 3,681,552 | 8/1972 | Winzen | 210/94 |

FOREIGN PATENT DOCUMENTS

| 7090 | of 1905 | United Kingdom | 210/446 |
| 2029255 | 3/1980 | United Kingdom | 210/447 |

Primary Examiner—Benoit Castel
Attorney, Agent, or Firm—Stanley G. Ade

[57] ABSTRACT

Filters, particularly relative small filters, usually include a screening element which readily clogs or becomes partially blocked with material thus impeding the flow of liquid therethrough. The present invention comprises a cylindrical filter housing or bowl portion bisected by a vertically situated screen element situated at an angle to the direction of flow so that the flow of fluid tends to wash the screen and deposit the sediment at the base of the housing. Preferably the housing is formed of clear plastic or glass so that the screen condition can be viewed. The base of the screen element is angulated and lies on the base of the housing upon the inlet side thereof so that when removing the screen for cleaning, any sediment may be lifted clear of the housing as the screen is removed.

2 Claims, 4 Drawing Figures

U.S. Patent
Jul. 20, 1982
4,340,470
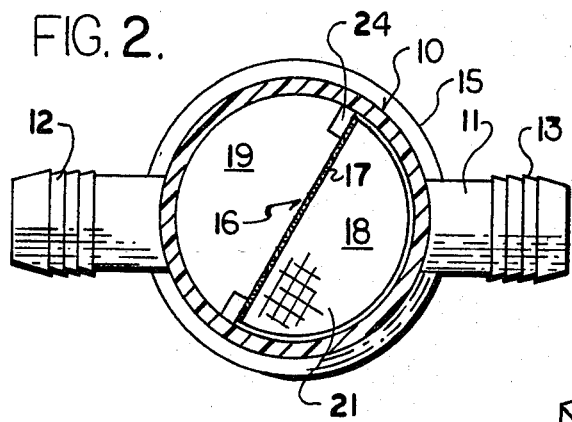
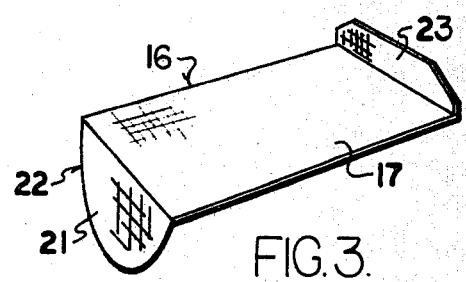
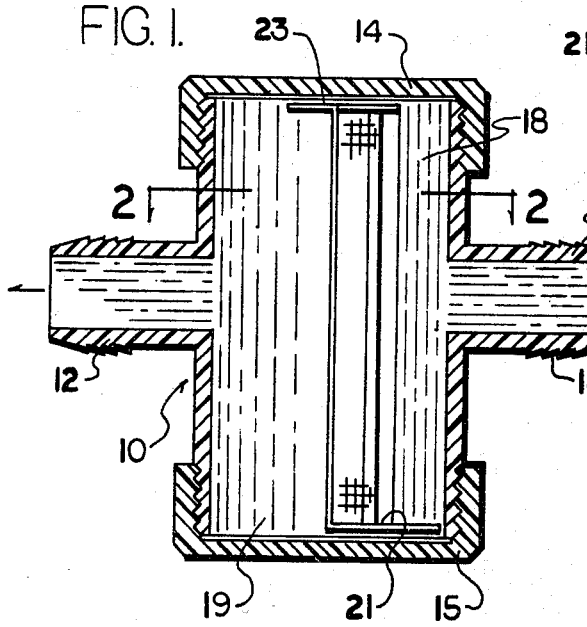
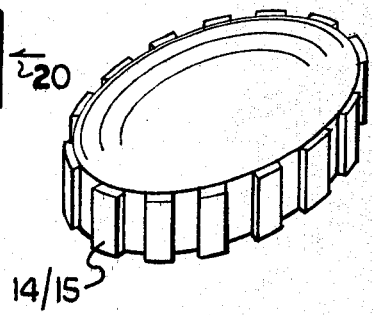

LIQUID FILTER

BACKGROUND OF THE INVENTION

This invention relates to new and useful improvements in liquid filters and although it is designed primarily for use with sewage pumps and the like, nevertheless it can be used to filter various other liquids in a variety of situations.

Most filters are either so small as to be easily clogged with material being filtered out of the liquid passing through the filter or, alternatively, the filter construction itself is not particularly suitable for use with certain types of undesirable materials.

Another disadvantage of the majority of filters is the difficulty in ascertaining whether or not the element is plugged except when there is a malfunction in the liquid flow.

SUMMARY OF THE INVENTION

The present invention overcomes these disadvantages and one aspect of the invention consists of a filter assembly for liquids comprising in combination a housing having an inlet and an outlet connected therewith, a removable screening element within said housing dividing said housing into an inlet portion and an outlet portion with said inlet communicating with said inlet portion and said outlet communicating with said outlet portion, said screening element being situated vertically within said housing.

Another advantage of this invention is that it may, if desired, be made of a transparent material such as synthetic plastic or glass so that the condition of the filter element is readily viewed.

A further advantage of the invention is that the filter element may be provided with a base portion spanning the inlet side of the filter housing on which sediment collects so that when the filter element is removed for cleaning and/or replacement, the collected sediment is readily lifted out of the housing with the element so that the housing itself does not have to be washed clean.

Still another advantage of the invention is to provide a device of the character herewithin described in which it is desirable to position the filter element so that it is self-washing whereupon any sediment is deposited upon the base of the filter element rather than clogging the screen element itself.

A still further advantage of the invention is to provide a device of the character herewithin described with is simple in construction, economical in manufacture and otherwise well suited to the purpose for which it is designed.

With the foregoing in view, and other advantages as will become apparent to those skilled in the art to which this invention relates as this specification proceeds, the invention is herein described by reference to the accompanying drawings forming a part hereof, which includes a description of the preferred typical embodiment of the principles of the present invention, in which:

DESCRIPTION OF THE DRAWINGS

FIG. 1 is a vertical cross sectional elevation of the filter.

FIG. 2 is a horizontal section along the line 2—2 of FIG. 1.

FIG. 3 is an isometric view of the filter element per se.

FIG. 4 is an isometric view of the end caps of the housing.

In the drawings like characters of reference indicate corresponding parts in the different figures.

DETAILED DESCRIPTION

Proceeding therefore to describe the invention in detail, reference should be made to the accompanying drawings in which the device comprises a housing collectively designated 10 which is preferably but not necessarily cylindrical in configuration, and is open ended. An inlet nipple 11 is provided through the wall on one side of the housing and an outlet nipple 12 is provided through the wall on the opposite side of the housing, preferably diametrically opposite to the inlet nipple 11. Annular serrations 13 may be provided on the outer surface of the nipples 11 and 12 to facilitate engagement of conduits such as flexible hoses or the like (not illustrated).

Screw threaded end caps 14 and 15 screw threadably engage the screw threaded upper and lower extremities of the housing respectively as clearly shown in FIG. 1 thus permitting ready access to the interior of the filter housing as well as facilitating manufacture thereof from, for example, cylindrical plastic tubing or elements.

A screening element is provided collectively designated 16 and this screening element is made of a screening material having interstices of a size to filter material from fluid passing therethrough, it being understood that the size of the mesh of the filter depends upon design parameters.

It consists of a vertically situated (when in situ) substantially rectangular main portion 17, the width of which is substantially equal to the diameter of the interior of the housing 10 so that when in position as illustrated in FIGS. 1 and 2, it divides the housing into an inlet portion 18 and an outlet portion 19 with the inlet nipple 11 communicating with the inlet portion 18 and the outlet nipple 12 communicating with the outlet portion 19.

The screening element 16 is preferably situated at an angle less than 90° from the direction of flow of the fluid indicated by arrow 20 so that fluid passing through the filter, tends to wash the filtering element clear of sediment which is thus deposited by gravity, at the base of the housing.

In the preferred embodiment, the lower end portion 21 of the filter is angulated at right angles to the plane of the main portion 17 and the edge wall 22 is curved similar to the curvature of the inner wall of the housing and covers the entire base of the inlet portion 18 thereof as clearly shown in FIGS. 1 and 2.

The upper end portion 23 of the filter element, is bent over at right angles to the plane of the main portion 17 and may be used to facilitate the removal of the filter for cleaning and/or replacement of the filter element, as will hereinafter be described.

The filter element extends from the base of the housing to the upper side thereof so that all fluid has to pass through the main portion 17 of the element.

Means are provided to position the element in the desired angular relationship relative to the direction of flow 20, said means taking the form of a pair of vertically situated lugs or projections 24 formed on the inner wall of the housing diametrically opposite one another as clearly shown in FIG. 2 so that when the element is placed within the housing, with the base portion 21 covering the base of the housing, the edges of the main portion 17 engage the lugs 24 so that rotation of the element within the housing is prevented.

In operation, the liquid passes through the filter in the direction of arrows 20, filtering out any solids of a size larger than the mesh of the filter and the flow of the fluid impinging at an angle upon the main portion 17, washing the main portion so that the sediment is deposited by gravity upon the lower portion 21 of the filter covering the entire base of the inlet portion 18.

When it is desired to remove the filter, the upper cap 14 is unscrewed from the housing and the finger of the operator engaged under the lip 23 thus enabling him to lift the filter element vertically from the housing together with the sediment collected upon the base portion 21 thereof whereupon the element may be washed and/or replaced as desired.

Finally, it should be noted that another advantage of the screw threaded end cap 15, apart from facilitating manufacture, is the fact that if the top cap 14 is not easily accessible for removal, the bottom cap can be removed and the screen dropped out of the open bottom of the housing.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

What I claim as my invention is:

1. A filter assembly for liquids comprising in combination a cylindrical housing including a cylindrical body portion having open upper and lower ends, caps screw threadably engageable upon each of said ends, for detachably closing said ends, an inlet and an outlet formed through the wall of said body portion substantially diametrically opposite one another and spaced above the lower end cap thereof, a removable screening element within said housing dividing said housing into an inlet portion and an outlet portion with said inlet communicating with said inlet portion and said outlet communicating with said outlet portion, said screening element being situated vertically within said housing and extending between said end caps, said screening element including a vertical portion and a base portion situated at right angles to said vertical portion and extending from the lower end of said vertical portion, said base portion covering substantially entirely the portion of the lower end cap within said inlet portion of said housing to collect and retain sediment thereon, means within said housing extending from the wall of said body portion and engageable by said screening element, for positioning said screening element within said housing, at an inclined angle less than 90° from the direction of flow of said liquid through said housing, said means for positioning said screening element including lug means on the inner wall of said housing engageable by the vertical side edges of said screening element to locate said element in the desired angular relationship relative to the direction of flow of liquid through said housing.

2. The invention according to claim 1 in which said body portion is transparent.

* * * * *